United States Patent [19]

Tyren et al.

[11] Patent Number: 5,576,693
[45] Date of Patent: Nov. 19, 1996

[54] METHOD AND DEVICE FOR REMOTE SENSING OF OBJECTS

[75] Inventors: Carl Tyren, Antibes, France; Leif Persson, Staffanstorp, Sweden

[73] Assignee: RSO Corporation N.V., Netherlands

[21] Appl. No.: 256,483

[22] PCT Filed: Jan. 20, 1993

[86] PCT No.: PCT/SE93/00036

§ 371 Date: Sep. 6, 1994

§ 102(e) Date: Sep. 6, 1994

[87] PCT Pub. No.: WO93/14478

PCT Pub. Date: Jul. 22, 1993

[30] Foreign Application Priority Data

Jan. 20, 1992 [SE] Sweden .................. 9200145

[51] Int. Cl.⁶ .................................. G08B 13/187
[52] U.S. Cl. ............................. 340/572; 340/551
[58] Field of Search ........................ 340/572, 551

[56] References Cited

U.S. PATENT DOCUMENTS

| | | | |
|---|---|---|---|
| 4,071,818 | 1/1978 | Krisst | 324/207.13 |
| 4,168,496 | 9/1979 | Lichtblau | 340/572 |
| 4,388,524 | 6/1983 | Walton | 235/380 |
| 4,399,437 | 8/1983 | Falck et al. | 340/825.54 |
| 4,459,474 | 7/1984 | Walton | 340/825.54 |
| 4,495,496 | 1/1985 | Miller, III | 340/825.54 |
| 4,510,490 | 4/1985 | Anderson, III et al. | 340/572 |
| 4,584,577 | 4/1986 | Temple | 340/870.32 |
| 4,600,829 | 7/1986 | Walton | 235/439 |
| 4,647,917 | 3/1987 | Anderson, III et al. | 340/572 |
| 4,656,463 | 4/1987 | Anders et al. | 340/572 |
| 4,727,360 | 2/1988 | Ferguson et al. | 340/572 |
| 4,940,966 | 7/1990 | Pettigrew et al. | 340/551 |
| 4,980,670 | 12/1990 | Humphrey et al. | 340/551 |
| 5,001,458 | 3/1991 | Tyrén et al. | 340/551 |
| 5,099,225 | 3/1992 | Narlow et al. | 340/572 |
| 5,111,186 | 5/1992 | Narlow et al. | 340/572 |
| 5,406,262 | 4/1995 | Herman et al. | 340/572 |

FOREIGN PATENT DOCUMENTS

| | | |
|---|---|---|
| 0338696 | 10/1989 | European Pat. Off. . |
| 0366335 | 5/1990 | European Pat. Off. . |
| 88/01427 | 2/1988 | WIPO . |
| 89/01722 | 2/1989 | WIPO . |
| 91/00494 | 1/1991 | WIPO . |
| 91/17515 | 11/1991 | WIPO . |

*Primary Examiner*—Glen Swann
*Attorney, Agent, or Firm*—Merchant, Gould, Smith, Edell Welter & Schmidt

[57] ABSTRACT

The invention relates to a method and a device for remote sensing of objects, said method including the steps of marking said objects with at least one label (10) comprising at least one electrical resonant circuit (14) having an induction means (11) and a capacitor means (12), exciting said resonant circuit (14) to resonance at a resonant frequency, and detecting said resonant frequency of said resonant circuit (14) by the electromagnetic energy transmitted from said resonant circuit (14). An element (13) of a magnetic material having a varying permeability is coupled inductively to said induction element (11). The resonant frequency of said resonant circuit (14) is affected by the permeability of said element (13) of magnetic material, and said element (13) of magnetic material is exposed to an external and spatially heterogenous magnetic bias field through which the permeability of said element (13) of magnetic material is controlled. The invention relates also to methods for coding labels and for noise suppression of signals received from said labels.

20 Claims, 7 Drawing Sheets

METHOD AND DEVICE FOR REMOTE SENSING OF OBJECTS

BACKGROUND OF THE INVENTION

The invention relates to a method and a device for remote sensing of objects. Within trade and industry the interest in non-optical and non-contact sensing of objects have increased lately. In stores and superstores it is interesting to read price labels and similar elements, and within the industry it is desirable to read identification labels in industrial materials flows. A plurality of non-optical and non-contact principles of identification of labels are used at present. Most common is perhaps antitheft labels in shops.

In a commonly used embodiment in trading, labels are used which are provided with a resonant circuit comprising a capacitive and an inductive element. Said resonant circuit can be forced to resonance by applying an electromagnetic signal having a defined energy content at the resonant frequency to said label in an interrogation zone normally provided at the exit of the shop. A detection device detecting signals from said resonant circuit at the resonant frequency produces an alarm if a label provided with an "activated" resonant circuit enters into said interrogation zone. A practical embodiment of a resonant circuit intended for this purpose is disclosed in U.S. Pat. No. 4,578,654. A complete system includes also a device for "deactivating" said label which is done on payment of the merchandise on which the label is attached to.

A problem of all previously known labels used for the purpose of limiting pilferage is a lack of ability of individually identifying each label when a plurality of labels is present simultaneously in said interrogation zone. For the purpose mentioned the problem is not relevant because an alarm should be delivered independently if one or a plurality of labels having an "activated" resonant circuit enters into said interrogation zone and is detected.

SUMMARY OF INVENTION

The method according to the present invention is based on the fact that certain magnetic and mechanical properties of elements shaped as tapes, wires or strips of amorphous materials are changed when the elements are exposed to a magnetic field, a so called bias field. The position/direction of an element is for instance related to the magnetic field in the longitudinal or axial direction of the amorphous element, and the mechanical resonant frequency of the element is a measure of the position/direction of the element. Corresponding conditions apply for a component comprising an amorphous element which is magnetically coupled to an inductive element in turn included in an electrical resonant circuit. When the magnetic field is changed the magnetic properties of the amorphous element are changed, and by that the inductance of said inductive element is changed. Then also the resonant frequency of the electrical resonant circuit is changed.

Also materials other than amorphous materials can be used according to the invention. The essential property of the material is that the characteristics thereof, for instance magnetic or elastic properties, are effected by magnetic fields. The influence must have such an extent that the change of properties is measurable by remote detecting, i.e. without establishment of a physical contact with said elements. It is also possible to use other materials, the electric or magnetic properties thereof being changed by an external magnetic field. An example is a material that is magnetoresistive, that is the electrical conductivity thereof being changed depending on a magnetic field, and a magnetooptical material, that is a material the light conducting ability thereof is changed depending on an applied magnetic field. For materials of said latter type a phenomenon referred to as the FARADY EFFECT is utilized, that is that the plane of oscillation of polarized light is pivoted, the pivoting angle being proportional to the magnetic field strength, or the phenomenon referred to as the KERR EFFECT, according to which a similar effect appears in some materials under influence of an electrical field.

The resonant frequency of an amorphous element showing a comparatively large magnetomechanical coupling is changed by the so called delta-E-effect with the magnetic flux intensity along the main direction of the element. If said magnetic flux intensity is changed as a function of the position/direction of said amorphous element the resonant frequency of said amorphous element will then be a function of the position/direction of said element. It is an advantage that the measuring information is produced as a frequency value because such a value is highly immune to interferences. Furthermore, a mix of information from a plurality of gauges, each of which operates at a separate frequency band, can be transferred together at one channel of information.

To increase the measuring precision it is possible also to utilize methods according to which a plurality of amorphous elements simultaneously are located in a measuring body. In such a case it is appropriate also to record beat frequencies and sum frequencies. By utilizing such differential measuring methods error sources such as for instance system deviation depending on temperature, material properties, changes of field, etc., can be eliminated.

It should be noted that the efficient magnetic field along the axial direction of said amorphous element is not necessarily equal to the projection of the total field vector along the amorphous element. By the flux conductive ability of said amorphous element and the geometry thereof there could be a deviation from pure projection. However, the relationship can always be determined and could still form the bases of recording objects that are provided with amorphous elements.

By using tapes of amorphous magnetoelastic alloys in a theft protection label it is possible also to use other physical effects and conditions. A theft protection label of this type will include one or a plurality of such tapes. Said tapes have a high magnetomechanical coupling which means among other things that the tapes can be made to oscillate mechanically by applying magnetic energy. During the mechanical oscillation also the magnetic properties change, which can be recorded by a detecting coil or similar device. An essential factor of the resonant frequency of the tape is the module of elasticity. Since the module of elasticity of the amorphous tapes used depends on external magnetic fields it is possible by varying such an external magnet field to change the resonant frequency of the tape. By providing a magnetic element that can be magnetized and demagnetized adjacent to a tape of an amorphous material the tape can be given two resonant frequencies, a first when the magnetic element is magnetized and a second when it is demagnetized. Such a system is disclosed in EP 0096182. In this type of systems it is necessary that the tapes are arranged to be moved freely in such a way that the mechanical movement during oscillation is not prevented or affected to such a level when a safe detection is in danger. The excitation of the tapes to oscillation as well as the detection of the resonant frequency is made through magnetic fields which highly limits the range of operation, in the excitation as well as during detection.

A more developed system for remote sensing of objects is disclosed in EP 00330656. Instead of an element of a magnetic material that can be magnetized and demagnetized, respectively, to set the resonant frequency of the tape a spatially heterogeneous magnetic field in the interrogation zone is used according to EP 00330656. In that way a plurality of labels located within different subareas of said interrogation zone in which the magnetic field is directed differently or is of a different strength can be sensed and identified even if a plurality of labels are provided with identical sets of tapes. However, problems and drawbacks of excitation and detection by means of magnetic fields still remain. Also in this type of labels it is important that the tapes are arranged on the label to be moved freely. Thus, said labels have to be produced, arranged on the objects and be handled in a proper way so that the movability of the tapes is not affected.

An object of the method and device for remote sensing of objects in accordance with the present invention, is to overcome the drawbacks indicated above by using an electric resonant circuit, and it is also an object to overcome problems and drawbacks of detection devices including tapes of a material having a high magnetomechanical coupling. Said objects have been achieved according to the invention by marking an object to be sensed with at least one label including an electrical resonant circuit having an inductive element and a capacitive element. The resonant circuit is excited to oscillate at a resonant frequency within the radio frequency spectrum. The resonant frequency of the resonant circuit is detected through the electromagnetic energy transmitted from the resonant circuit. An element of magnetic material having a varying permeability is inductively coupled to the inductive element such that the resonant frequency of the resonant circuit is affected by the permeability of the element of magnetic material. Detection is accomplished by exposing the element of magnetic material to an external and spatially heterogeneous magnetic bias field to control the permeability of the element of magnetic material.

Developments of the invention with regard to coding of the identity of said labels, and with regard to interference suppression of received signals are also provided.

BRIEF DESCRIPTION OF THE DRAWINGS

The invention will now be described in more detail by means of embodiments, reference being made to the accompanying drawings in which FIG. 16 depicts an inductive element and a magnetic element combined in a web-like structure.

DETAILED DESCRIPTION

Figure 1:
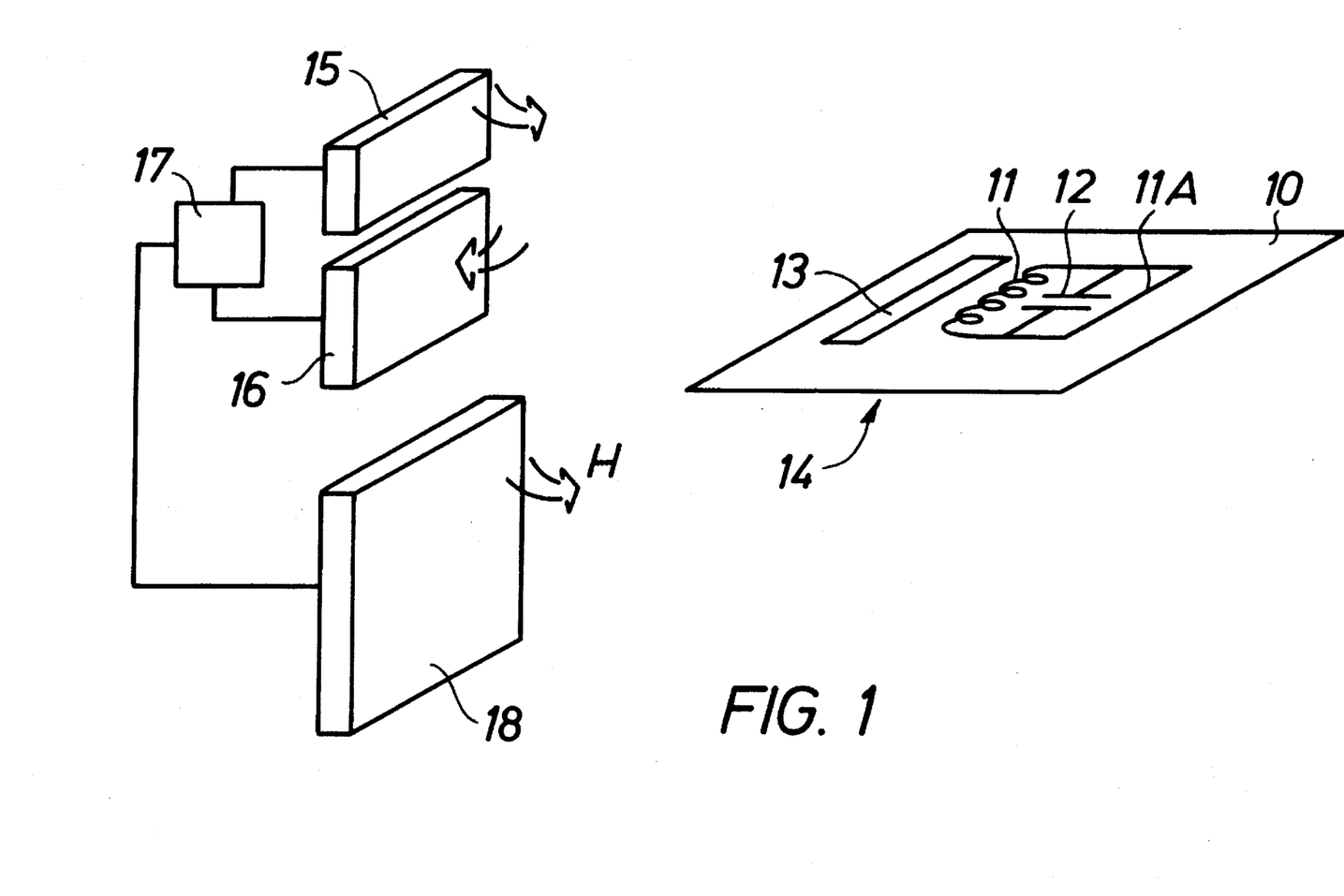
FIG. 1 is a schematic view showing the method and the device according to the invention.

FIG. 1 shows a label 10 which is provided with an electric resonant circuit 14. A label refers according to the invention to any elements that can be mounted on or during production be embedded in objects that can be remotely detected. The resonant circuit can for instance be embedded in a wall or a surface of the object such as a spine, embedded in a cavity in a piece of furniture, molded into a plastic part, or in a similar manner.

The electrical resonant circuit 14, comprises an inductive element 11 and a capacitive element 12, and has through said elements an antenna function. In the embodiment shown in FIG. 1 there is also provided a further conductor 11a. Said conductor 11a is connected in parallel with said capacitive element 12, in this case formed as a capacitor, and constitutes a part of said inductive element. Said inductive element 11 including a coil is inductively coupled to an element 13 made of a magnetic material. Said element 13 is arranged adjacent to or within said coil. Said element 13 is preferably made of a tape of an amorphous alloy. Said element 13 of magnetic material possesses according to the invention such a property that the permeability thereof will vary by the influence of an external magnetic field. By the inductive coupling between said element 13 and said coil 11 the resonant frequency of said resonant circuit 14 depends directly on the magnetic properties, that is the permeability of said element 13.

To excite said resonant circuit 14 to oscillation at the resonant frequency of said resonant circuit, which falls within a radio frequency interval, an electrical excitation means 15 is provided. Preferably said excitation means 15 comprises an electromagnetic antenna which is connected to a control unit 17 including a transmitting unit not shown here. An embodiment of an antenna 15 is shows in FIG. 5. To said control unit 17 there is connected also a detecting means 16 which preferably also includes an antenna. To allow a plurality of identical labels having identical resonant circuits 14 to be detected, identified and recorded when they simultaneously are located in an interrogation zone there is provided a means 18 for producing a magnetic field. Said means 18 is operatively connected to said control unit 17 and produces a spatially heterogenous magnetic field varying in strength and/or direction in each location or subvolume of the interrogation zone. The magnetic field generated provides a spatial reference system that can be used in different ways according to the invention. A difference of magnetic field between adjacent location or subareas within said interrogation zone will affect magnetically said magnetic elements 13 of each of said resonant circuits so that the relative permeability thereof will be changed differently. In that way also the property of the inductive elements of said resonant circuits are affected differently resulting in different offsets of the resonant frequency of said resonant circuits. Said offset depends on the characteristics of the magnetic field in the location of said label and said magnetic element, and also on the orientation of the element in space.

Figure 2A:
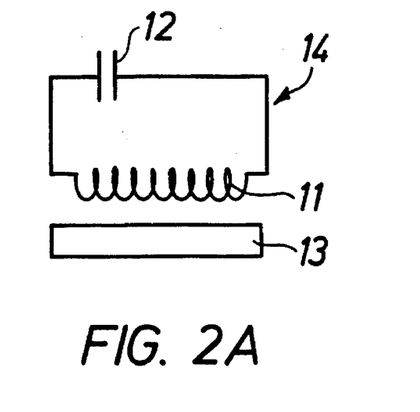
FIG. 2A shows a first alternative embodiment of a resonant circuit to be used according to the invention.

FIG. 2A shows an alternative embodiment of said resonant circuit. The difference compared to resonant circuit shown in FIG. 1 is that said conductor 11a has been excluded.

Figure 2B:
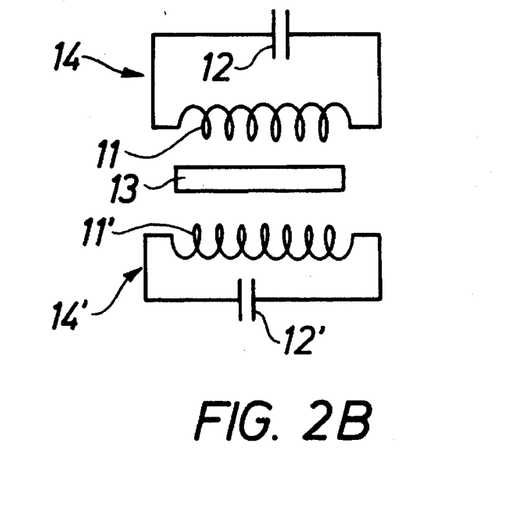
FIG. 2B shows a second alternative embodiment having double resonant circuits to be used according to the invention.

FIG. 2B shows another alternative embodiment including double resonant circuits 14 and 14' which are connected to a common element 13 made of a magnetic material. The resonant frequencies of said resonant circuits 14 and 14' can be made different by applying to the coil 11' and the capacitor 12' of said second resonant circuit 14' different properties than corresponding components of said first resonant circuit 14. Also other alternative configuration of an inductive element 11, a capacitive element 12, and elements 13 made of magnetic materials are possible within the scope of the invention. Other configuration can be chosen also to improve other electrical properties of the resonant circuit such as Q value, antenna properties, etc.

Figure 3:
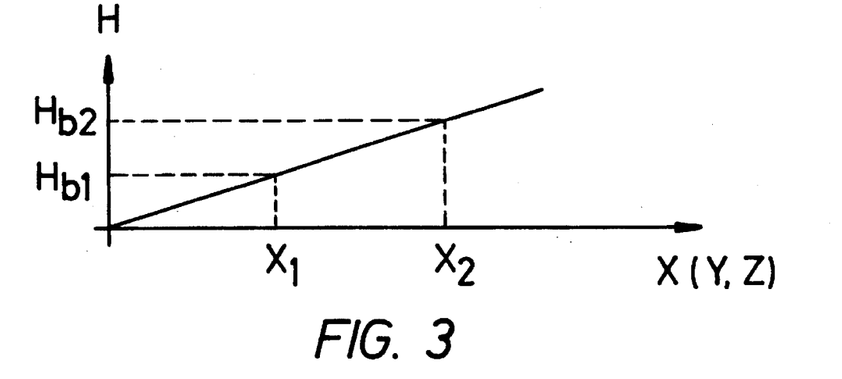
FIG. 3 is a diagram showing how the magnetizing field strength depends on the position in an interrogation zone used according to the invention.

The physical background explaining why it is possible according to the invention to identify a plurality of identical labels within the interrogation zone will now be described with reference to FIG. 3 and FIG. 4. Said means 18 for generating a magnetic field and described in connection with FIG. 1 generates a spatially heterogenous magnetic field in said interrogation zone. Said magnetic field in the interrogation zone will vary with regard to strength and/or direction in different locations within the interrogation zone. This is illustrated schematically in FIG. 3 showing the variation of the magnetic field strength in different locations, for instance having different X coordinates.

The amorphous material of the tapes that preferably are used according to the invention possess such a property that the relative permeability depends on the magnetic field strength H and accordingly on the magnetic field B in the interrogation zone.

Figure 4:
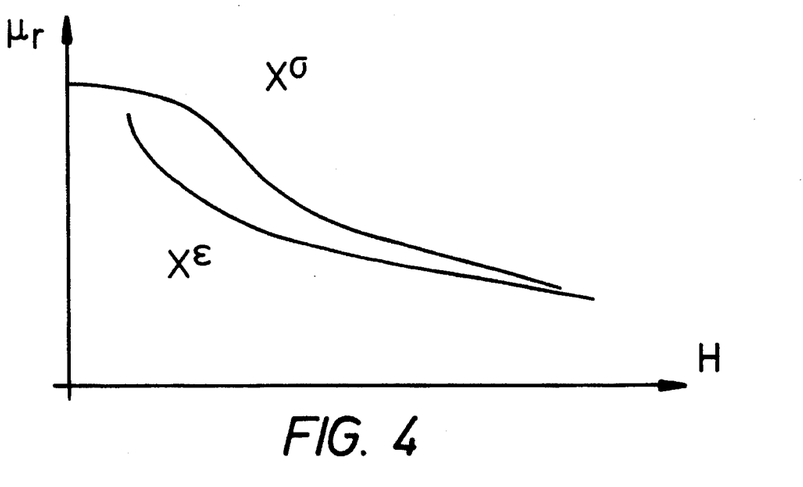
FIG. 4 is a diagram showing the relative permeability of a tape made of a magnetic material in relation to the magnetizing field strength in the interrogation zone.

FIG. 4 is a graphical representation showing this relation. The amorphous material has a very high magnetomechanical coupling and thus the magnetic properties of the amorphous material are affected also by the mechanical conditions that the tapes of amorphous material are exposed to. The upper diagram line in FIG. 4 marked $_{102}{}^\sigma$ shows how the relative permeability depends on the magnetic field strength when the tape can be moved freely and is allowed to oscillate also mechanically. The lower diagram line marked $_x\epsilon$ shows the dependence of the relative permeability on the magnet field strength when the tape of amorphous material is fixedly attached and cannot oscillate mechanically. According to the invention anyone of the conditions indicated can be employed and it is possible also to utilize "double" properties either as a further coding of a label or for setting said label from an "activated" condition in which said label in a pricing system indicates a merchandise that has not been paid for, and a "deactivated" condition in which said label indicates a merchandise that has been paid for. Because the magnetic field in the interrogation zone will vary in all locations or subvolumes all magnetic elements located in said interrogation zone will be exposed to a magnetic field of different strength or direction. In that way the relative permeability of said magnetic elements 13 will have different values depending on the position and orientation of the element in the interrogation zone, and this will in turn change the electrical properties and the resonant frequency of said resonant circuit 14. This may be described by the relation L=f($\mu_r$), illustrating that the induction L is a function of the relative permeability $\mu_r$.

In a basic embodiment each of the resonant circuits of all labels has a unique resonant frequency which will identify the label in a basic condition, that is in a condition with a known and stable magnetic field. Then when the label is disposed in the interrogation zone the resonant frequency of the resonant circuit will be offset. Different resonant frequencies and maximum variations allowed in the magnetic field from said device 18 are chosen in such a way that the resonant circuits and thus also the labels of different objects cannot be mixed up by the detecting system 18.

In further developed embodiments a plurality of elements 13 made of magnetic material, are combined to make the frequency dependence of the resonant circuit of the external magnetic field more complex and hard to copy.

Figure 10:
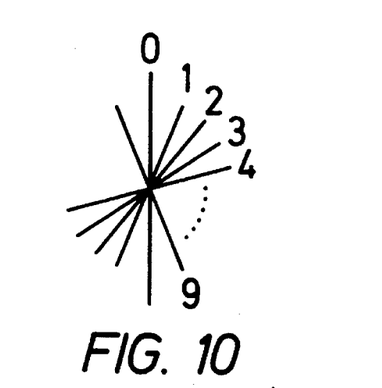
FIG. 10 shows schematically a coding method according to a development of the invention.
Figure 12:
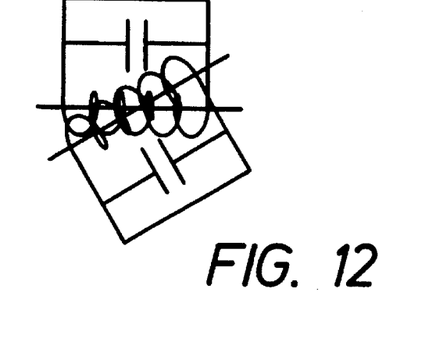
FIG. 12 shows a practical embodiment for the method of coding according to FIG. 10.

Tapes made of amorphous material are extremely direction sensitive, that is their sensitivity to external influence in the form of external magnetic fields, traction and compression strain force, etc., varies highly with the orientation in relation to the direction in which the external force is supplied. Such a condition is used already in the basic embodiment of a label according to the invention allowing a plurality of identical labels that are oriented in different directions to be readily separated by the detection system even if they are disposed in the absolute vicinity to each other. In a further developed embodiment of a label according to the invention a plurality of identical tapes of amorphous material or tapes formed in different ways are arranged on top of each other but pivoted in relation to each other. This will allow an extremely extensive and complex coding of a label in a very compact embodiment. An alternative coding method is described below with reference to FIG. 10. FIG. 12 illustrates a practical embodiment of FIG. 10. To further increase the safety it is appropriate also to execute a plurality of consecutive detecting steps having different sequences of heterogenous magnetic bias fields.

Figure 5:
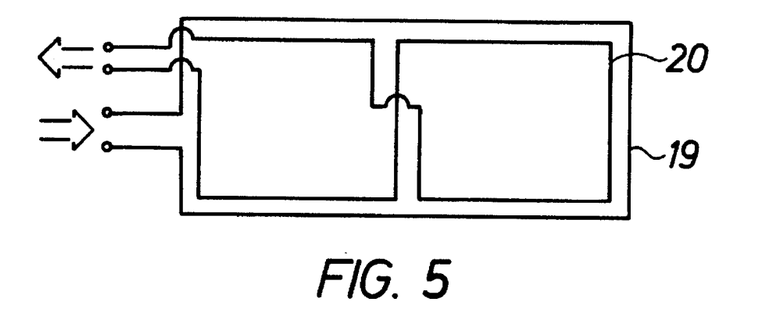
FIG. 5 is a schematic view showing a combined transmitting and receiving antenna to be used according to the method of the invention.

The electrical excitation means 15 as well as the detection means 16 comprise some kind of antenna for transmitting and receiving, respectively, electromagnetic radiation in form av radio waves. An example of a combined transmitter and receiver antenna is shown in FIG. 5. A transmitting antenna 19 which is operatively connected to said excitation means 15 and formed as a single loop of rectangular shape encloses a receiver antenna 20 shaped as figure-eight and operating as a balanced frame antenna. Said receiver antenna 20 is operatively connected to said detecting means 16. The embodiment of an antenna arrangement shown in FIG. 5 is preferred because transmitting and receiving at the same frequency is facilitated. Also other more or less conventionally formed antenna systems can be used within the scope of the present invention. The resonant circuit 14 emits energy also within other frequency intervals than the resonant frequency, for instance harmonics of the resonant frequency, and thus it is appropriate in certain applications to excite said resonant circuits at one frequency and to detect oscillations at another frequency.

Figure 7:
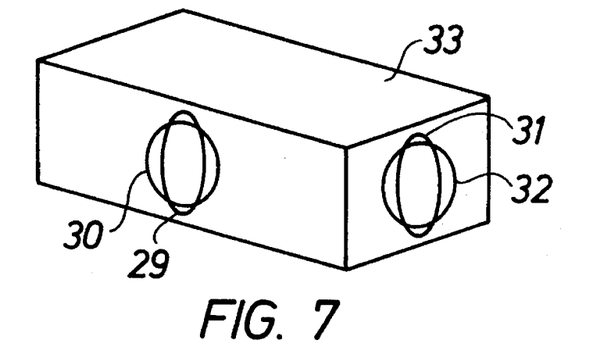
FIG. 7 shows schematically in a perspective view an interrogation zone with biasing coils.
Figure 8:
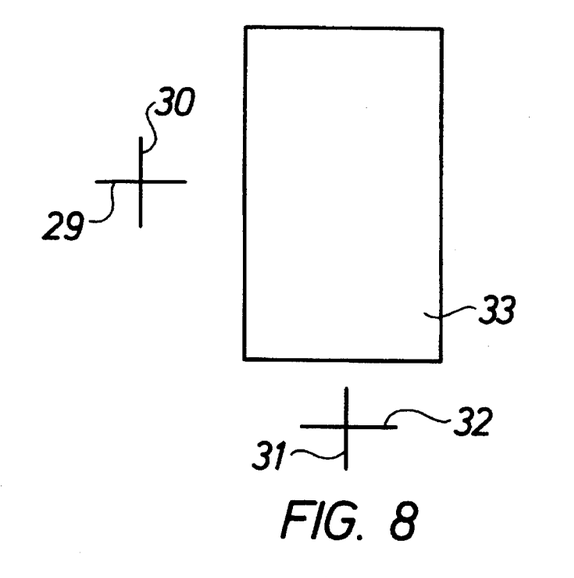
FIG. 8 is a top view of the device of FIG. 7.

FIG. 7 shows an example of the arrangement of said interrogation zone with the means for generating a magnetic field. In the shown embodiment the heterogenous magnetic field in said interrogation zone 33 is generated by four coils 29,30,31,32 which are arranged in pairs in right angles on different non-opposing sides of the interrogation zone 33. The orientation of the coils are shown also in FIG. 8 which is a top view of the interrogation zone 33 with said coils 29,30,31,32 shown schematically.

On large demands of miniaturization of the label thin fill technique or similar techniques can be used to produce the complete label including the capacitive element 12 and the inductive element 11 and other conductors and antenna function included therein. Also coil elements and capacitors produced as conventional elements can be used in some applications.

In an alternative embodiment, as illustrated in FIG. 16, said inductive element 11 and said magnetic element 13 are connected into a so called "cloth inductor" in which said elements are combined into a web like structure. This embodiment will provide a high magnetic coupling factor between said magnetic element and said inductive element.

Figure 9:
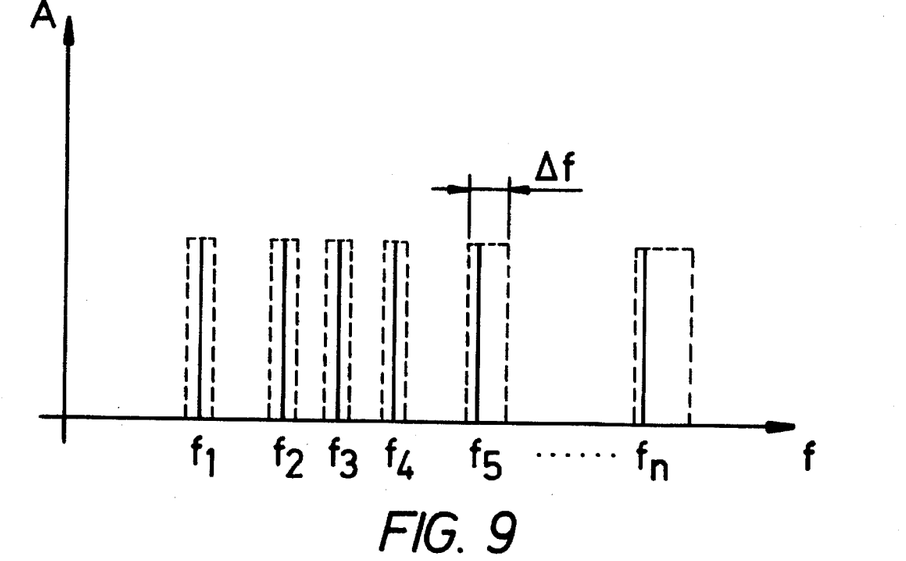
FIG. 9 is a diagram showing a combination of resonant circuits having different resonant frequencies.

In an application for pricing labels each label is provided with n resonant circuits having n different resonant frequencies. The diagram of FIG. 9 shows detected resonant frequencies $f_1 \ldots f_n$ from one of said labels. Each resonant frequency defines one "bit" in a code of an item. Existence of a specified resonant frequency in the detected signal will indicate that the corresponding "bit" is set. The offset of the resonant frequency of all resonant circuits depending on the bias field is known and therefore all resonant circuits that are exposed to one and the same bias field can be related to a specific label. Then the label is identified by the combination of resonant circuits, that is of the resonant frequencies, giving the code of the item. The resonant frequencies will vary or be offset within the dashed area in FIG. 9 for each frequency.

The method and the device according to the invention are very suitable to be used in different applications in connections with marking, for instance price marking in trade, marking of products within manufacturing industry or transport industry, in coding of credit cards, and also in "seal marking" of for instance documents, tickets, etc. In the latter application the previously described embodiment, having a plurality of bands of amorphous material together forming a more "complex" transfer function of permeability and external magnetic field, can be used.

The method and the device according to the invention can be applied also in determining position and/or orientation. In such an application the magnetic field generated in said interrogation zone is known in detail in every location with any desired resolution. When a measuring object including the resonance circuit according to the invention is entered into said interrogation zone and the resonance frequency thereof is detected by the detecting means 16 the deviation of frequency from a nominal resonance frequency of the circuit is an exact indication of the position of the object in the interrogation zone. A corresponding method can be applied also for direct distance measuring. To determine only the orientation a completely homogeneous bias field can be used.

The method and device according to the invention can be used also in other applications and at other frequencies not disclosed here. At lower frequencies than radio frequencies the coupling between the label and the transmitter/receiver is made mostly on the basis of induction. The embodiments of resonant circuits and control and detection systems disclosed above should be regarded only as examples, a plurality of other embodiments are possible within the scope of the invention as defined in the accompanying claims.

At least two properties of tapes, wires and similar elements of amorphous material are affected in a basic way by a surrounding magnetic field. A first property to be affected is the elastic properties of the element, and in that case the so called delta-E effect is used. Variations of elastic properties affect directly other properties of the element, for instance the mechanical resonant frequency of the element. The mechanical resonant frequency can be detected as a magnetic signal, for instance by a detecting coil because the magnetomechanical coupling of said element is very large.

The detected signal includes besides the desired signal also different interference signals appearing around the measuring site. To be able to use the detected signals as desired when identifying elements any unwanted signals have to be filtered out or suppressed.

Figure 14:
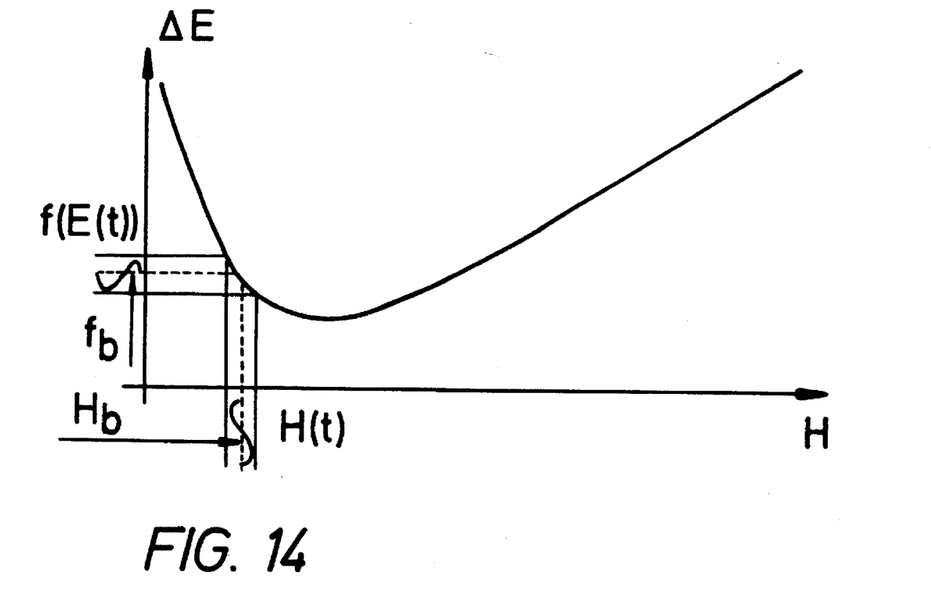

To accomplish a suppression or filtering the following measures can be taken. When an element is exposed to a varying magnetic field strength the resonant frequency of the element will vary according to the variation of the field strength. FIG. 14 is a graphical representation showing delta-E of an element as a function of a magnetic field strength H. When the magnetic field strength is varied according to a first function the delta-E of the element will vary according to a second function that can be associated to or be identified with said first function. By suppressing all detected signals that are not associated in this way to said first function it is ensured that only wanted signals are recorded and further processed.

Figure 15:
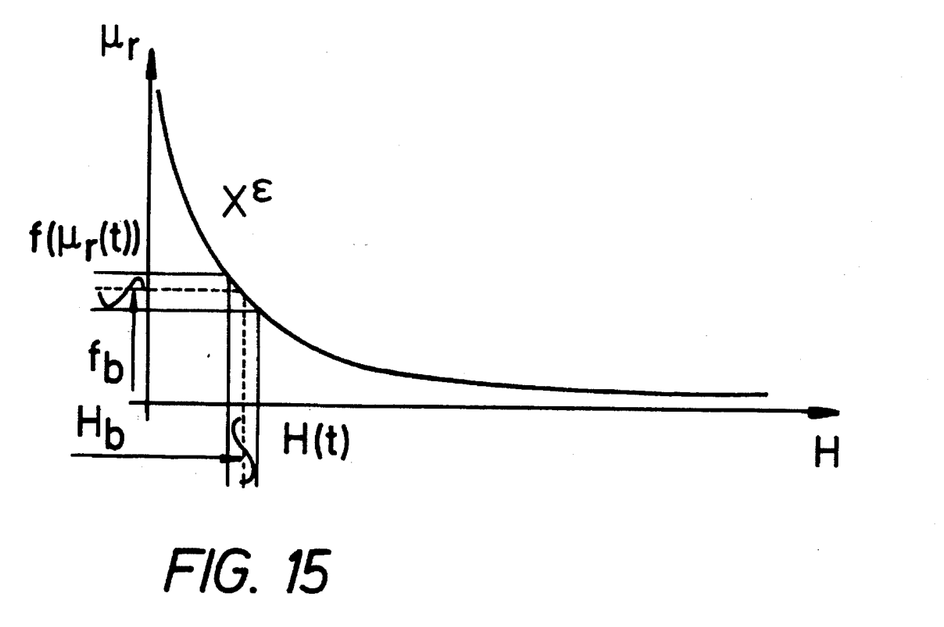

FIG. 15 shows correspondingly how a second property of an element is affected, namely the relative permeability $\mu_r$. Also $\mu_r$ is a function of the magnetic field strength H. Any influence on said relative permeability is suitably detected by coupling said element magnetically to an inductive element included in an electric resonant circuit which includes also a capacitor. When said resonant circuit is excited to oscillate it will transmit electromagnetic radiation which can be recorded by means corresponding to conventional radio receivers. The frequency of the electromagnetic signal is then affected by the surrounding magnetic field strength H.

Interference signals appear also in this type of detecting, and it is highly desirable to suppress interference signals also in this type of detecting. This is conveniently done according to a method as indicated above.

Figure 6:
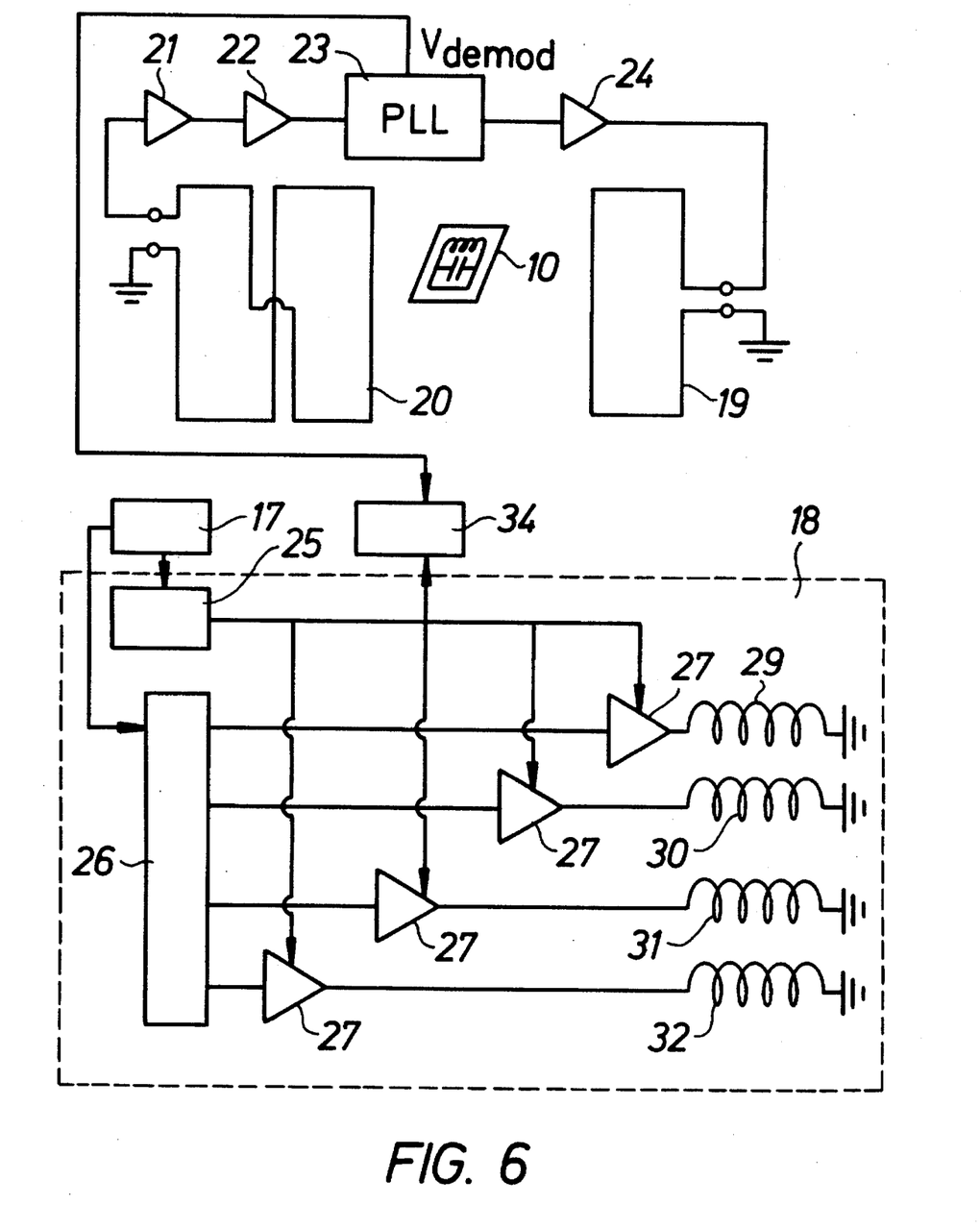
FIG. 6 is a schematic view showing a further development of a device for detecting objects.

FIG. 6 shows an embodiment of a device according to the invention. In this embodiment said means 18 for generating a magnetic field includes a modulator 25 which modulates the magnetic field generated by said coils 29,30,31,32 in accordance with a predetermined function. Said coils 29,30, 31,32 are fed by a current generating means 26 through controllable amplifiers 27. Said current generating means 26 and said modulator 25 are controlled by said control unit 17, which is operatively connected thereto.

The device comprises also a transmitter antenna 19 and a receiver antenna 20 formed in accordance with the embodiment shown in FIG. 5. One label 10 is located in the interrogation zone. The input signal from said receiver antenna 20 is amplified in a first amplifier 21 and then in a second amplifier 22 before being fed into a PLL-circuit (Phase Locked Loop) 23. A frequency output of said PLL circuit 23 is connected to said transmitter antenna 19 through an amplifier 24. An internal, frequency adjusting signal in said PLL-circuit is tapped and fed to a comparator 34. Said tapped signal referred to as $V_{demod}$ forms a demodulated signal corresponding to the signal generated in a modulating unit 25 in said means 18 for generating a magnetic field. When the bias signal is not modulated said signal of the PLL-circuit is a measure of the present non-modulated resonant frequency. Also the signal generated in said modulating unit 25 is fed to said comparator 34 so as to compare the controlling modulating signal from said modulator unit 25 to the demodulating signal from said PLL-circuit 23. The result of the comparison is preferably used to filter out any disturbances appearing in the interrogation zone and being received together with the wanted signal.

To ensure that a received signal originates from an element to be remotely detected it is possible also to sample the received signal that originates from an amorphous element. In a basic embodiment of such a method the sampled signal defining a received frequency is controlled to vary in time. During correct conditions the received frequency is the resonant frequency of an element. If this is the case the sampled signal is regarded to be a wanted signal and said signal is processed as indicated above to determine any existence of a specific amorphous element on a label or similar device, and thereby to identify the label and the object on which the label is attached.

In further developed systems there is a digital signal processing of the sampled signal so as to determine the relation between the variation of the bias field and the variation of the sampled signal. Only if the relation meats predetermined standards the received sampled signal is passed on. The determination of the relation can be made for instance by dividing the received resonant frequency signal into Fourier-coefficients. When these are compared the accordance between the controlled signal and the received signal can be determined.

According to an alternative and basic embodiment there is instead made a filtering of the static part of the received frequency signal. If a varying-part remains, that is if the frequency varies, this will be accepted as a confirmation of the signal originating from an element which has been affected by the bias field.

Different factors will affect the selection of decoding methods. One important factor is the environment with respect to interferences that exist in the detection volume.

The bias field can be adjusted with regard to the absolute value of the magnetic field strength and also with regard to the direction of the magnetic field strength.

A further method for ensuring that a received signal originates from an element to be remotely detected is based on producing distortion in a controlled and predetermined manner of the signal transmitted from the element of amorphous material. Then only received signals that have been distorted in the predetermined way are used for determining existing resonant frequencies.

The signal processing being made on a received signal to suppress unwanted signals is the same independent of the received signal being magnetic, when the magnetomechanical coupling of the amorphous element is used, or electromagnetic, when the influence of the element on an electric resonant circuit is used.

To provide a coding of labels allowing identification of a plurality of labels in a detection volume even if a plurality of identical labels is located in the volume at the same time at least three embodiments are possible. A first embodiment is similar to a type of binary coding. In a fixed set of elements shaped as tapes or wires of amorphous material elements may be present or be removed corresponding to 1 and 0 in a binary code. The number of tapes is also equal to the number of bit positions, and the tapes are all different. This would mean comparatively large costs for producing labels and will limit to some extent the total number of possible label identities.

In an alternative coding method a plurality of magnetic elements 13 are disposed "on top of" each other with an angular deviation and will each by the angular position thereof constitute a "bit" or a code position. In the embodiment shown in FIGS. 10 and 12 the position system has the base 10 because each element can be set into one of ten angular orientation positions. Each element 13 is given a unique length/resonant frequency. When there are a plurality of labels at the same time in a detecting zone the detecting device will read code elements from a specific label as they are all located in one and the same coordinate position with different angular orientations in one and the same pivoting plane (if the label is plane). Different labels can be separated by different x,y,z-position and/or different "pivoting planes", which means that each label is individually detectable even if a plurality of identical labels are detected simultaneously.

A major advantage with the second coding method compared to the binary code indicated above with regard to read reliability is that the number of amorphous element in the second coding method is always constant (for a specific number interval or base) because the code information is in the signal relation, that is the frequency relation or angle between the different amorphous code elements, and not in the existence or non-existence of a specific amorphous element which is the case when the binary coded label is used. This would mean that the number of amorphous elements that is provided in each label is known, which is not the case in a binary coded label. Then the detecting system can control that all code elements have been recorded and can also determine if any label lacks any of the elements. This highly improves the validation process during detection.

Using such a coding method different detecting algorithms can be used. Thess can be divided into algorithms implying that the bias field used is known and mapped, and such algorithms that do not require knowledge of the characteristics of the magnetic field. Both methods of detecting can be used according to the present invention.

According to a coding method the angles between the amorphous elements of the label are used to define the code position. Thus, each element can be set to represent any code value within a predetermined number interval. That means that the base can be considerably larger than two, for instance 30. When using the base 30 and on condition that a label comprises four coding elements plus a reference element it is possible to provide code values between 0 and 809999 using five tapes, and if binary code is used only values 0–31 can be utilized.

An algorithm for detecting labels having two reference elements and four coding elements will now be described. In the description below it is assumed that all tapes in a label have different length so as to be readily identified separately.

On condition that the local magnetic field distribution over a label is homogeneous the two reference elements will provide the angle and the absolute value of the magnetic field vector over said label in the plane of the label. The two right angle components of the bias field are determined by using the detected resonance frequency of the elements. The detected resonant frequency corresponds to the bias field along the longitudinal axes of the elements. Having knowledge about the effective value and the angle of the bias vector in the actual plane the angles of the code elements can be determined by utilizing the relation between detected frequency and magnetic field. This is done for each code element. The value of the bias vector along a code element divided with the value of the bias vector in the plane determined as indicated above will provide immediately, or indirectly as a result of influence of adjacent elements, through another function, the cosines of the angle between a code element and the bias vector. As the angle of the bias vector has been determined it is possible also to determine the angle of the code element and thus the code value set for the specific code element. The code value determined might be corrected with regard to influence from adjacent bands.

However, a problem still remains of relating signals from different elements to each label. However, it is possible to calculate all possible combinations of reference and code elements. Among these also the correct codes are included together with a large number of noise codes.

By providing a sequence of different bias field situations and calculating for each bias field situation all possible codes the correct codes will be repeated to a completely different extent than the noise codes. Only those codes that are "repeated" will then be accepted. It is obvious that when a large number of labels is located in the detection volume at the same time the number of possible codes will be extremely large. To facilitate the analysis of incoming signals it can be appropriate to divide the detection volume into a plurality of smaller subvolumes. Then the number of labels per volume will be lower and the algorithm for analysis can be executed faster. It is possible also to eliminate a number of possible codes by certain modulation of the bias field and by using further logical functions.

Figure 11:
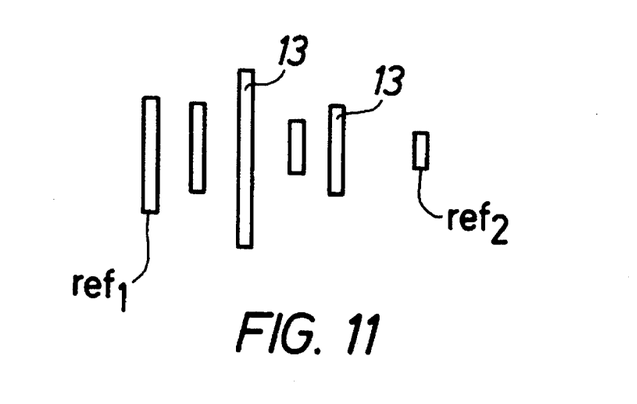
FIG. 11 shows schematically an alternative coding embodiment according to a development of the invention.
Figure 13:
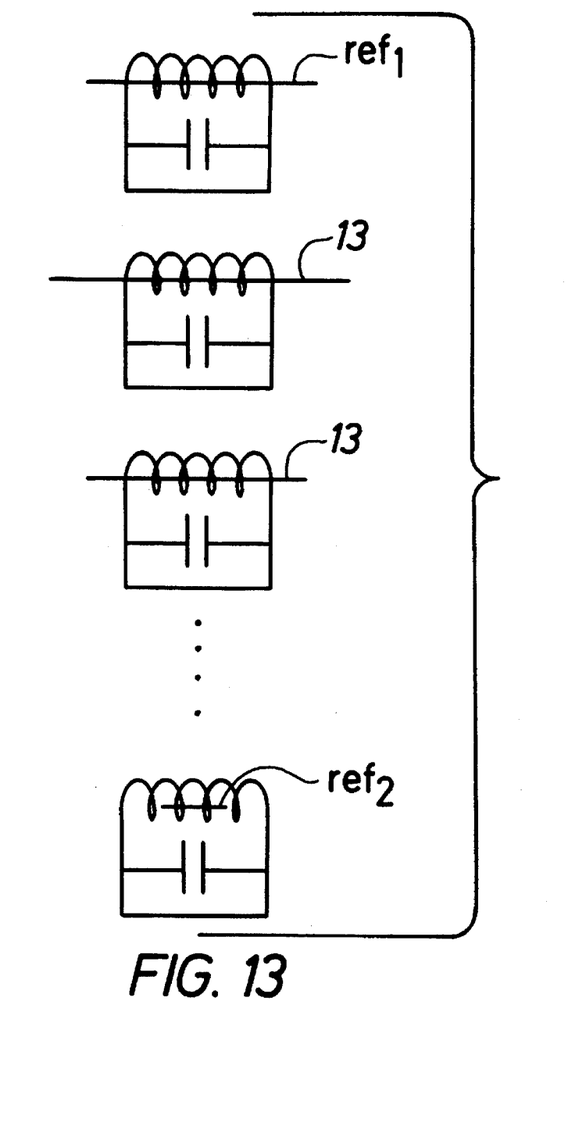
FIG. 13 shows a practical embodiment for a method of coding according to FIG. 11, FIGS. 14 and 15 are graphical representations showing characteristics of the material that can be used according to the invention.

In an alternative embodiment according to FIG. 11 and FIG. 13 of the coding method described above the possibility of remote detecting of the angle between elements is not used but instead the possibility of remote detecting of the relative distance between single elements is utilized. Such an alternative coding method corresponds to some extent to the commonly used pincode.

One example of such an embodiment comprises a label having a plurality of elements of different length arranged in parallel on a distance from a reference tape. The distance from said reference tape to the actual distance of a specific element constitutes a code value of the element. To improve reading possibilities of a label of such a type it is appropriate to arrange also a second reference element on a distance from said first reference tape. All other elements are arranged between said reference elements. By using two reference elements it is possible when reading to determine the local field gradiant along the code elements and the label. Hereby it is possible to read in all regards the information of the label without knowing in detail the actual local magnetic field.

The alternative code method described above has a plurality of advantages in relation to the previously described angle code method. For instance all elements are arranged in parallel which means that the efficient bias field applied over a label is more limited or defined than in the angle coding method. Hereby the reading of the label is facilitated. A side effect is that all elements probably will be read through one and the same detecting channel which will reduce the distortion during transmission caused by detecting coils and detecting electronics.

The angle coding method and also the distance coding method described above can be utilized at mechanical resonance of the elements and detecting magnetic field changes as a result of the mechanical resonance, but also at electrical resonance, wherein the elements are included in electrical resonance circuits as magnetic elements coupled to the coil included in said resonance circuit.

We claim:

1. Method of remote sensing of objects comprising the steps of:

marking said objects with at least one label including at least one electrical resonance circuit having an inductive element and a capacitive element;

exciting said resonance circuit to oscillate at a resonance frequency within a radio frequency spectrum; and detecting the resonance frequency of the resonance circuit through the electromagnetic energy transmitted from said resonance circuit, the detecting step including the steps of inductively coupling an element of magnetic material having a varying permeability to said inductive element, affecting the resonance frequency of the resonance circuit through the permeability of the element of magnetic material, and exposing said element of magnetic material to an external and spatially heterogeneous magnetic bias field to control the permeability of said element of magnetic material.

2. Method according to claim 1 wherein the permeability of said element of magnetic material controls the resonance frequency of a plurality of resonance circuits.

3. Method according to claim 1 wherein one element of magnetic material is inductively coupled to inductive elements of at least two electrical resonance circuits.

4. A device for remote sensing of objects, each object being marked with at least one label including at least one electric resonant circuit having an inductive element and a capacitive element, said resonant circuit being formed to be excited to oscillation at a resonant frequency within the radio frequency spectrum, the device comprising:

an electrical excitation means for producing an electromagnetic signal exciting said resonant circuit;

a detecting means, sensitive to electromagnetic radiation, for detecting electromagnetic radiation from said resonant circuit, said resonant circuit including at least one element inductively coupled to said inductive element, said at least one element being formed of a magnetic material having a varying permeability for affecting the resonant frequency of said resonant circuit; and a magnetic field generating means for generating, in an interrogation zone, a spatially heterogeneous magnetic bias field by which the permeability of said element of magnetic material is affected.

5. Device according to claim 4, wherein said element of magnetic material is mechanically anchored to prevent mechanical oscillation.

6. Device according to claim 4, wherein said label is provided with a combination of mechanically anchored and mechanically free elements of magnetic material.

7. Device according to claim 4, wherein said electric resonant circuit comprises a plurality of elements of magnetic material having different magnetic characteristics.

8. Device according to claim 4, wherein said label comprises a combination of resonant circuits collectively forming an item code of the object.

9. Device according to claim 4, wherein said means for generating a magnetic field is formed to generate an adjustably modulated signal for generating a modulated bias field.

10. Device according to claim 4, wherein said element of magnetic material is made of an amorphous material.

11. Device according to claim 10 wherein said inductive element and said magnetic element are combined into a web like structure.

12. Method for determining in three dimensions the position and orientation of objects marked with at least one label including at least one electric resonant circuit having an inductive element and capacitive element, the method comprising the steps of:

exciting said resonant circuit to oscillation at a resonant frequency within the radio frequency spectrum; and detecting the resonant frequency of the resonant circuit by the electromagnetic energy transmitted from said resonant circuit, the detecting step including the steps of inductively coupling an element made of magnetic material of a varying permeability to said inductive element such that the resonant frequency of said resonant circuit is controlled by the permeability of the element made of magnetic material, exposing the element made of magnetic material to an external magnetic bias field which is known in all points with a desired resolution with regard to strength and/or direction, through which bias field the permeability of said element made of magnetic material is affected, and determining the position and orientation of the objects using the resonant frequency detected and controlled by said magnetic bias field.

13. Method of remote sensing of objects, comprising the steps of:

providing an object with an element made of a material, the characteristics thereof being influenced by a surrounding magnetic field;

exposing said element to a magnetic field strength H;

detecting the influence of the field strength on the characteristics by receiving a signal of magnetic or electromagnetic radiation from said element;

varying the magnetic field strength H according to a predetermined function;

comparing said received signal to said predetermined function; and using any parts of the received signal having a predetermined correlation with the predetermined function for the remote sensing of the object.

14. Method according to claim 13, wherein the predetermined function is a function varying in time with a certain frequency, said received signal is fed to a Phase Locked Loop (PLL) comprising a voltage controlled oscillator and a phase detector, the output thereof controlling the frequency of the oscillator, the output signal of said phase detector being related to the frequency of the varying function when said loop has been locked to the received signal, and wherein the output level of the phase detector is compared to a predetermined level corresponding to a certain frequency of the varying function, a correlation between the output level and the predetermined level indicating that the received signal originates from a remotely detected element.

15. Method according to claim 14, wherein said magnetic field strength H is controlled to vary in time and a time varying part of the received signal is separated and used for the remote sensing.

16. Method for coding remotely detected labels, comprising the steps of:

providing at least two elements for each label, the characteristics thereof being changed by an external magnetic field, said label being exposed to a biasing magnetic field covering a detecting volume that is larger than the label for detecting the characteristics of said elements changed by said magnetic field;

orienting elements of each label in predetermined mutual relationships for providing an identity to the label determined by said relationships when said elements are exposed to a sequence of different field distributions, the local field distribution of the biasing field over said label being continuously determined;

wherein the mutual relationship between the elements is determined depending on the orientation of each element in the local field distribution by comparing actual properties of the elements influenced by said magnetic field, and expected properties of elements arranged in predetermined relationships to each other in the local field distribution.

17. Method according to claim 16, wherein said elements are elongated, and said elements are oriented in fixed mutual angle relationships with regard to the longitudinal direction of said elements.

18. Method according to claim 16, wherein said elements are elongated, and said elements are oriented with fixed mutual distances in a direction transverse to the longitudinal direction of said elements.

19. Method according to claim 16, wherein the orientation of the elements is determined in relation to a reference element.

20. Method according to claim 19, wherein the local field distribution is determined by providing at least two reference elements on the label, said reference elements being located with a known mutual orientation.

* * * * *

UNITED STATES PATENT AND TRADEMARK OFFICE
CERTIFICATE OF CORRECTION

PATENT NO. : 5,576,693

DATED : November 19, 1996

INVENTOR(S) : Tyren, et al.

It is certified that error appears in the above-identified patent and that said Letters Patent is hereby corrected as shown below:

Abstract, line 2: delete "The invention relates to a "; insert --A-- before "method"; delete "a" after the word "and".

Abstract, line 3: insert --is disclosed.-- after the word "objects"; "said" should read --The--; "including" should read --includes--.

Abstract, line 4: delete "(10)" after the word "label".

Abstract, lines 5, 7, 9, 10, 13: delete "(14)" after the word "circuit".

Abstract, line 6: delete "means (11)" after the word "induction"; insert --element-- after the word "induction"; delete "means (12)" after the word "capacitor".

Abstract, line 7: insert --a-- after the word "to".

Abstract, lines 10, 14, 15, 17: delete "(13)" after the word "element".

UNITED STATES PATENT AND TRADEMARK OFFICE
CERTIFICATE OF CORRECTION

| | | |
|---|---|---|
| PATENT NO. : | 5,576,693 | PAGE 2 of 3 |
| DATED : | November 19, 1996 | |
| INVENTOR(S) : | Tyren, et al. | |

It is certified that error appears in the above-identified patent and that said Letters Patent is hereby corrected as shown below:

Abstract, line 12: delete "(11)" after the word "element".

Abstract, line 16: "heterogenous" should read --heterogeneous".

Abstract, line 18: delete "The invention relates also to methods" after the word "controlled"; insert --Also disclosed is a device to practice the method and methods-- after the word "controlled".

Column 2, line 3: insert --in which-- after the word "material".

Column 4, line 58: delete "." before the numeral "16".

UNITED STATES PATENT AND TRADEMARK OFFICE
CERTIFICATE OF CORRECTION

PATENT NO. :  5,576,693

DATED     :  November 19, 1996

INVENTOR(S) :  Tyren, et al.

It is certified that error appears in the above-identified patent and that said Letters Patent is hereby corrected as shown below:

Column 5, line 52: "$102^\sigma$" should read --$X^\sigma$--.

Column 9, line 36 "varying-part" should read --varying part--.

Column 12, claim 1, line 14: insert --said method characterized by-- after the word "circuit".

Column 12, claim 4, line 46: insert --at least one-- after the word "said".

Column 13, claim 12, line 13: insert --; and-- after the word "circuit".

Column 13, claim 12, line 18: insert --characterized by the steps of-- after the word "material".

Signed and Sealed this

Seventeenth Day of March, 1998

Attest:

BRUCE LEHMAN

Attesting Officer

Commissioner of Patents and Trademarks